(12) United States Patent
Gonidec et al.

(10) Patent No.: US 10,774,786 B2
(45) Date of Patent: Sep. 15, 2020

(54) SYSTEM FOR ACTUATING A PANEL OF A TURBOJET ENGINE NACELLE

(71) Applicant: Safran Nacelles, Gonfreville L'Orcher (FR)

(72) Inventors: Patrick Gonidec, Gonfreville L'Orcher (FR); Loïc Chapelain, Gonfreville L'Orcher (FR); Faycel Bouabdallah, Gonfreville L'Orcher (FR)

(73) Assignee: Safran Nacelles, Gonfreville L'Orcher (FR)

( * ) Notice: Subject to any disclaimer, the term of this patent is extended or adjusted under 35 U.S.C. 154(b) by 55 days.

(21) Appl. No.: 16/257,765

(22) Filed: Jan. 25, 2019

(65) Prior Publication Data
US 2019/0170088 A1    Jun. 6, 2019

Related U.S. Application Data

(63) Continuation of application No. PCT/FR2017/051995, filed on Jul. 20, 2017.

(30) Foreign Application Priority Data

Jul. 25, 2016   (FR) ..................................... 16 57124

(51) Int. Cl.
*F02K 1/76* (2006.01)
*F02K 1/11* (2006.01)
(Continued)

(52) U.S. Cl.
CPC ............. *F02K 1/763* (2013.01); *B64D 29/06* (2013.01); *F02K 1/06* (2013.01); *F02K 1/11* (2013.01);
(Continued)

(58) Field of Classification Search
CPC ... F02K 1/763; F02K 1/11; F02K 1/12; F02K 1/06; F02K 1/60; F02K 1/62; F02K 1/70
See application file for complete search history.

(56) References Cited

U.S. PATENT DOCUMENTS

| 6,009,702 A * | 1/2000 | Gonidec | F02K 1/70 |
| | | | 239/265.37 |
| 2005/0086927 A1 * | 4/2005 | Lair | F02K 1/72 |
| | | | 60/226.2 |

(Continued)

FOREIGN PATENT DOCUMENTS

| EP | 2987991 | 2/2016 |
| WO | 2015001276 | 1/2015 |

OTHER PUBLICATIONS

International Search Report for International Application PCT/FR2017/051995, dated Nov. 10, 2017.

*Primary Examiner* — Andrew H Nguyen
(74) *Attorney, Agent, or Firm* — Burris Law, PLLC

(57) ABSTRACT

A pod for a turbojet engine includes an outer cowl having a structure with at least one opening and a panel pivotably mounted about an axis between a closed position and an open position, and a system for actuating the panel designed to lock the panel in closed position and to move same between the closed position and the open position thereof. The actuation system includes a lateral connecting rod connected to the panel and to the structure, pivoting relative to the structure about a first pivoting axis and about a second pivoting axis, and a linear actuator attached to the lateral connecting rod. The actuator system is designed to move the lateral connecting rod during the extension of the actuator, and the lateral connecting rod exerts a force on the panel during the movement thereof, pivoting the panel about the axis thereof.

14 Claims, 5 Drawing Sheets

(51) Int. Cl.
*F02K 1/12* (2006.01)
*F02K 1/06* (2006.01)
*B64D 29/06* (2006.01)
*F02K 1/70* (2006.01)

(52) U.S. Cl.
CPC .............. *F02K 1/12* (2013.01); *F02K 1/1207* (2013.01); *F02K 1/70* (2013.01); *F05D 2250/42* (2013.01); *F05D 2260/57* (2013.01); *F05D 2270/62* (2013.01)

(56) References Cited

U.S. PATENT DOCUMENTS

| | | | |
|---|---|---|---|
| 2005/0151012 A1* | 7/2005 | Lair | F02K 1/763 244/110 B |
| 2012/0193448 A1* | 8/2012 | Caruel | F02K 1/763 239/265.29 |
| 2016/0258315 A1* | 9/2016 | Vintinner | F01D 17/105 |
| 2017/0082064 A1* | 3/2017 | Tissot | F02K 1/09 |

* cited by examiner

SYSTEM FOR ACTUATING A PANEL OF A TURBOJET ENGINE NACELLE

CROSS-REFERENCE TO RELATED APPLICATIONS

This application is a continuation of International Application No. PCT/FR2017/051995, filed on Jul. 20, 2017, which claims priority to and the benefit of FR 16/57124 filed on Jul. 25, 2016. The disclosures of the above applications are incorporated herein by reference.

FIELD

The present disclosure relates to the field of nacelles for aircraft turbojet engines.

BACKGROUND

The statements in this section merely provide background information related to the present disclosure and may not constitute prior art.

An aircraft is propelled by several turbojet engines each housed in a nacelle.

A nacelle generally has a tubular structure comprising an air inlet upstream of the turbojet engine, a median section intended to surround a fan of the turbojet engine, a downstream section intended to surround the combustion chamber of the turbojet engine and to constitute the ejection nozzle of the flow of the fan of the engine that does not pass through the combustion chamber (secondary flow). This nozzle is commonly called secondary flow path or cold flow channel of the nacelle. This portion often includes a thrust reverser, a device for allowing obtaining aerodynamic braking of the aircraft during landing by returning the secondary flow forward.

This nacelle is intended to accommodate a bypass turbojet engine capable of generating via the blades of the rotating fan a hot air flow (also called primary flow), originating from the combustion chamber of the turbojet engine, and a cold air flow (secondary flow) already mentioned above. The outlet section of this nozzle is delimited by the outer trailing edge of the nacelle and the central body of this nacelle. This secondary ejection section controls the flow rate of air passing through the secondary nozzle and therefore governs to some extent the operation of the engine.

The optimum section of the ejection nozzle can be adapted according to the different phases of flight, namely the takeoff, climbing, cruise, descent and landing phases of the aircraft. It is indeed useful to be able to increase this section during the takeoff and landing phases, and to reduce it during cruise phases: this often relates to a nozzle with a variable outlet section, or else to "VFN" or "VAFN," the acronym for "Variable Fan Nozzle" or "Variable Area Fan Nozzle." The already well-known advantages of such variable-section nozzles, also called adaptive nozzles, consist in particular in noise reduction or fuel consumption decrease. In addition to that, it also allows ensuring the operation of the engine while avoiding engine pumping (too much compression rate with too little flow rate causes opening of the VAFN) or overspeed at the level of the fan rectifier (too much flow rate in the secondary flow path causes closure of the outlet section).

Among the various embodiments of ejection nozzles of the prior art, it is in particular known to perform the variation of the outlet section of the nozzle from pivoting panels positioned at a downstream end of the sliding thrust reverser cowl, rotatably mounted about an axis substantially transverse to a longitudinal axis of the nacelle. The pivoting of these panels causes a variation of the section of the secondary nozzle. This rotation is often coupled with a translation allowing to improve the aerodynamics of the device.

The panels of the nozzle, sometimes called "doors," or even "flaps," are typically associated with an actuation system piloted by the engine management system. In this case it is therefore important to be able to actuate the thrust reverser cowl and the panels of the adaptive nozzle independently. Particularly, the systems for maintaining the thrust reverser in folded flight position must in no case be impacted by the operation of the variable nozzle.

To perform this independent actuation, each movable part of the nacelle (thrust reverser cowl, nozzle panels) can be equipped with its own actuation system, and thus be driven independently. This relates to a segregated actuation of the nozzle panels and of the thrust reverser cowl.

An alternative to this segregated operating mode consists in mutualizing the actuation systems of the thrust reverser cowl and of the nozzle panels. For this purpose, a single system of actuators is used for the thrust reverser cowl and for the nozzle panels, and the thrust reverser is equipped with locking/unlocking means and with a system for coupling the actuators of the thrust reverser with the nozzle doors designed to authorize movement of the nozzle panels independently of the (locked) position of the thrust reverser sliding cowl. The actuators are then provided with a system allowing a displacement of the doors without moving the sliding cowl of the thrust reverser and, on the contrary, this system will not move the panels of the nozzle when the thrust reverser is deployed.

Regardless of the selected actuation system, whether segregated or mutualized, the actuation of the nozzle panels is performed by means of one or more actuator(s) substantially parallel to the longitudinal axis of the nacelle, these actuators controlling, via a movement transmission system (for example a suitable rod assembly), the rotation of one or more panel(s) of the nozzle. Thus, the forces generated at the actuators during the rotation of these nozzle panels are oriented along the longitudinal axis of the nacelle, and are transmitted in particular to the structure of the nacelle which approximates the movable panels of the nozzle. These longitudinal forces generated by the rotation of the nozzle panels appear to be very penalizing because they can cause axial scooping generating deformations of the structure of the nacelle which approximates the movable panels of the nozzle. The scooping effect is in addition further substantially increased when the thrust reverser cowl of the nacelle is an "O-duct" type cowl, that is to say a cowl in the form of a one-piece shroud.

SUMMARY

The present disclosure concerns a nacelle for an aircraft turbojet engine, the nacelle comprising:
an outer cowling comprising:
a structure comprising at least one aperture,
at least one panel, at least pivotally mounted about an axis between a closed position according to which it obstructs said aperture and an open position according to which it authorizes passage of a part of a secondary air flow through said aperture, the secondary air flow flowing in an annular channel defined between said outer cowling and an inner fixed structure of the nacelle defining a fairing of the turbojet engine, a system for actuating the panel, designed to lock the panel in said closed position and to displace said panel alternately between said closed position and said open position, said nacelle being remarkable in that said actuation system comprises:

at least one lateral tie rod, on one side, connected to the panel and, on the other side, connected to the structure of the outer cowling, said lateral tie rod being pivotally mounted relative to said structure, on one side, about a first pivot axis substantially parallel to a longitudinal axis of the nacelle and, on the other side, about a second pivot axis substantially perpendicular to the first pivot axis, a linear actuator, attached to said lateral tie rod, capable of alternately passing between a retracted position and an extended position, the actuation system being further designed to displace the lateral tie rod during the extension of said actuator, causing the pivoting of said lateral tie rod about said first and second pivot axes, and so that the lateral tie rod, bearing on said structure, exerts, during its displacement, a force on the panel, causing a pivoting of said panel about its axis.

Thus, when opening the panel, the forces are taken over by the lateral tie rods of the actuation system and not by the longitudinal actuator as is the case in the prior art. The forces are therefore substantially distributed along the circumference of the nacelle. The forces on the structure of the outer cowling of the nacelle which approximates the movable panels are thus substantially circumferential, and substantially aligned with the pressure forces on the panel.

According to one characteristic of the nacelle according to the present disclosure:

the actuator is attached to the lateral tie rod by a movement transmission device comprising:

a yoke attached to the panel and pivotally mounted about a substantially vertical axis, a movable rod of the actuator being attached to said yoke; and a spider on which is mounted, via a ball-joint connection, a second end of the lateral tie rod.

According to one form of the present disclosure, the panel is further mounted free in translation along an axis substantially parallel to a longitudinal axis of the nacelle and the actuation system is further designed to alternately drive the panel from a downstream position to an upstream position of the nacelle when the panel passes from its closed position to its open position. This configuration allows substantially improving the aerodynamic behavior of the system by avoiding creating a too pronounced convergent divergent which induces significant losses in the VFN channel.

To this end, at least one side wall of the panel includes a slotted hole in which is mounted a roller secured to the structure of the outer cowling, so as to authorize translation of the movable panel along an axis substantially parallel to the longitudinal axis of the nacelle, and the actuation system comprises a longitudinal tie rod whose first end is connected to said structure and whose second end is connected to the yoke of the movement transmission device.

Alternatively, at least one side wall of the panel includes a rail receiving a ball joint or a slider secured to the structure of the outer cowling, so as to authorize translation of the movable panel along an axis substantially parallel to the longitudinal axis of the nacelle, and in that the actuation system comprises a longitudinal tie rod whose first end is connected to said structure and whose second end is connected to the yoke of the movement transmission device.

According to various structural characteristics of the nacelle according to the present disclosure:

a first end of the lateral tie rod is connected to the structure of the outer cowling via a yoke pivotally mounted about the first pivot axis;

the lateral tie rod is further pivotally mounted relative to the yoke about the second pivot axis;

the panel includes an opening profiled on at least one side wall of the panel, the lateral tie rod passing through said opening;

the actuator is attached to an upstream wall of the panel;

the actuator and the movement transmission device are located in an inner space of the panel;

each panel, in one form, includes two actuation systems that are symmetrical relative to an axis of symmetry of the panel, each comprising their own hydraulic, electrical or aeraulic actuation motor;

the panel is further translated in a direction substantially parallel to a longitudinal axis of the nacelle, and the actuation system is further designed to alternately drive the panel from a downstream position to an upstream position of the nacelle when the panel passes from its closed position to its open position;

the panel is a panel of a secondary air flow ejection nozzle; and/or the outer cowling forms a sliding cowl of a thrust reverser device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
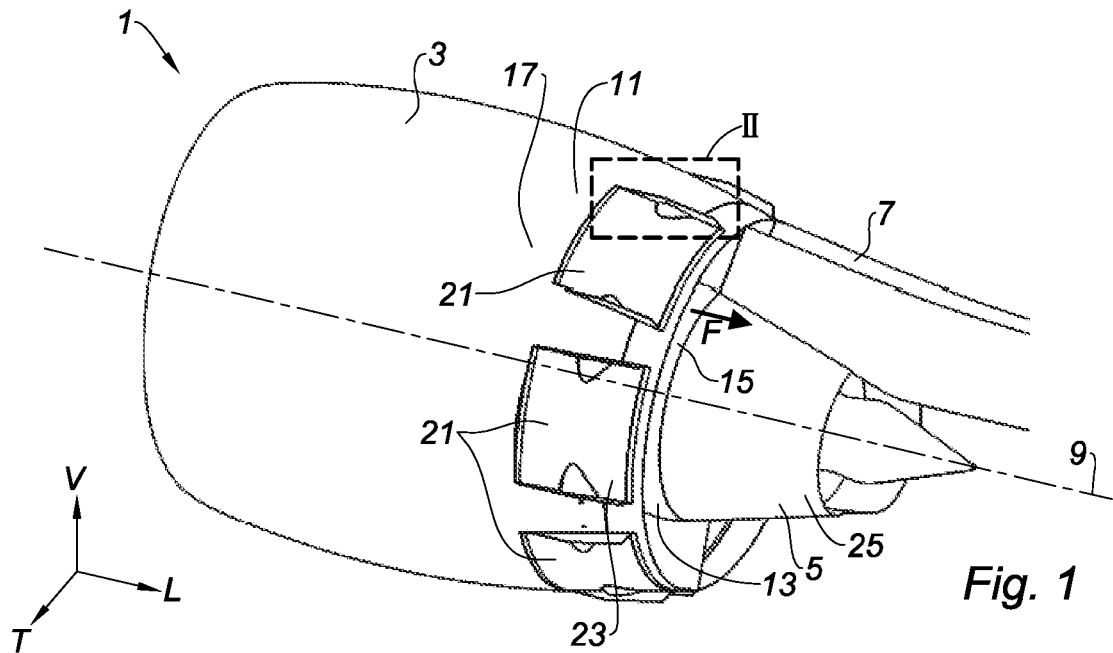
FIG. 1 shows a nacelle equipped with movable panels capable of being moved by the actuation system of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Note that in the description and in the claims, the words "upstream" and "downstream" should be understood relative to the circulation of the air flow within the propulsion assembly formed by the nacelle and the turbojet engine, that is to say from left to right with reference to FIG. 1.

Likewise, the expressions "inner" and "outer" should be used in a non-limiting manner with reference to the radial distance relative to the longitudinal axis of the nacelle, the expression "inner" defining an area radially closer to the longitudinal axis of the nacelle, as opposed to the expression "outer."

In addition, in the description and the claims, to clarify the description and the claims, the terminology longitudinal, vertical and transverse will be adopted in a non-limiting manner with reference to the L, V, T direct trihedron indicated in the figures, whose longitudinal axis L is parallel to the longitudinal axis of the nacelle.

Furthermore, throughout the figures, identical or similar references represent identical or similar members or sets of members.

Referring to FIG. 1 on which is shown a propulsion unit 1 formed by a nacelle 3 and a bypass turbojet engine 5, suspended from a fixed structure (not shown) of the aircraft, for example under a wing or on the fuselage, via a pylon 7 or a mast.

The nacelle 3 constitutes a housing of the bypass turbojet engine 5 and serves to channel the air flows that it generates via the blades of a fan (not visible), namely a hot air flow passing through a combustion chamber of the turbojet engine 5, and a cold air flow F circulating outside the turbojet engine 5. The nacelle 3 conventionally adopts a generally tubular shape of a longitudinal axis 9. The nacelle 3 comprises an outer cowling 11 able to receive a thrust reverser device (not shown) and an inner fixed structure 13 defining a fairing of the turbojet engine 5. The inner fixed structure 13 defines, with the outer cowling 11, an annular channel 15 for the flowing of the cold air flow F, or secondary flow, circulating outside the turbojet engine 5. The cold air flow flows from upstream to downstream of the propulsion unit.

Figure 3:
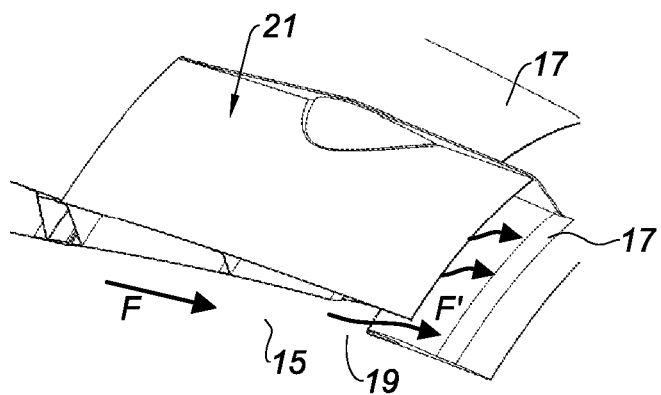
FIG. 3 is a view of the area II of FIG. 1 illustrating the panel in the open position.

The outer cowling 11 of the nacelle comprises a structure 17 having a plurality of apertures 19 (an aperture 19 is visible in FIG. 3) distributed on the circumference of the nacelle. The outer cowling 11 of the nacelle further includes a plurality of panels 21, also sometimes called "doors" or even "flaps," positioned at the apertures 19 of the cowling. The panels 21 are designed to completely obstruct the corresponding apertures 19 of the outer cowling 11. Thanks to an actuation system according to the present disclosure detailed below, the panels 21 are able to alternatively completely or partially obstruct their corresponding apertures 19.

The structure 17 of the outer cowling 11 of the nacelle can be fixed relative to the rest of the nacelle in the case of a nacelle called "smooth" nacelle, that is to say without thrust reverser means. When the nacelle is equipped with a thrust reverser device, the outer cowling 11 constitutes a sliding cowl of the thrust reverser device, and the structure 17 is then movable relative to the rest of the nacelle.

Figure 2:
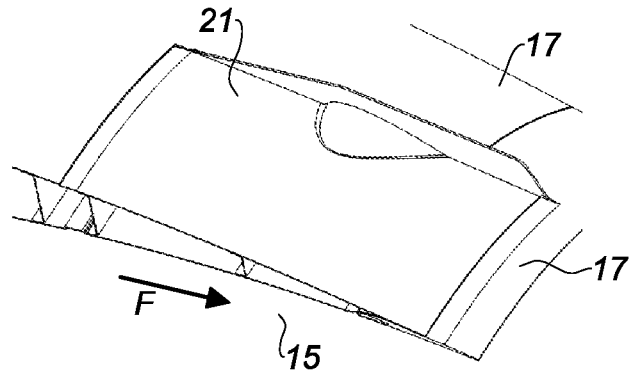
FIG. 2 is a view of the area II of FIG. 1 illustrating the panel in the closed position.

When a panel 21 completely obstructs the corresponding aperture 19, it is said that it is in a closed position. In this position shown in FIG. 2, the entire secondary air flow F flowing through the annular channel 15 escapes through the downstream of the nacelle.

When a panel 21 only partially obstructs the corresponding aperture 19, it is said that it is in an open position. In this position shown in FIG. 3, a part F' of the secondary air flow F flowing in the annular channel 15 can pass through the aperture 19.

Each panel 21 can be associated with its own actuation system according to the present disclosure, so that each panel 21 can be in either of these open or closed positions regardless of the position of the neighboring panels.

Alternatively, a movement synchronization system may be provided to impart the position of one of the panels 21 of the nacelle to the neighboring panels.

A panel 21 typically constitutes a panel of a secondary air flow ejection nozzle 23 (visible in FIG. 1), a nozzle that can be additional to a primary nozzle 25 (visible in FIG. 1) channeling the hot air flow. The optimum section of the secondary air flow ejection nozzle can then be adapted according to the different phases of flight, namely the takeoff, climbing, cruise, descent and landing phases of the aircraft.

The actuation system according to a first form of the present disclosure will now be described with reference to FIGS. 4 to 9.

Figure 4:
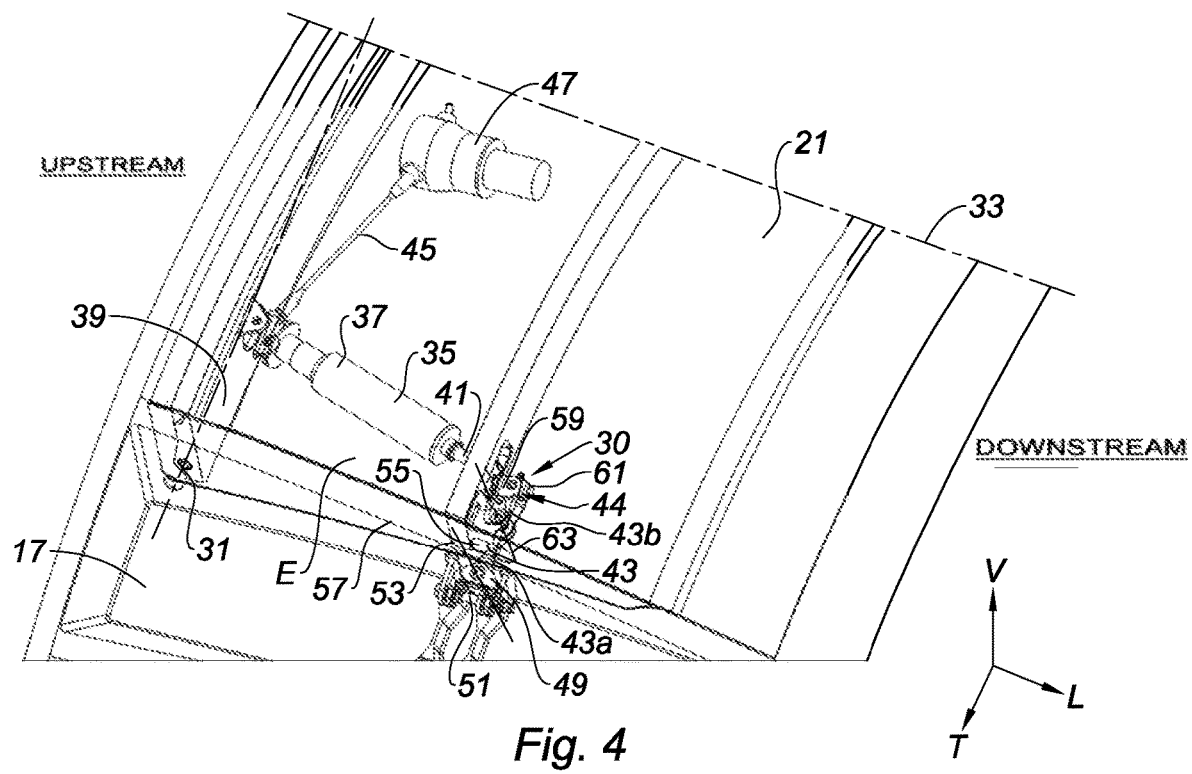
FIG. 4 illustrates an actuation system made according to a first form of the present disclosure, the panel being in the closed position.
Figure 5:
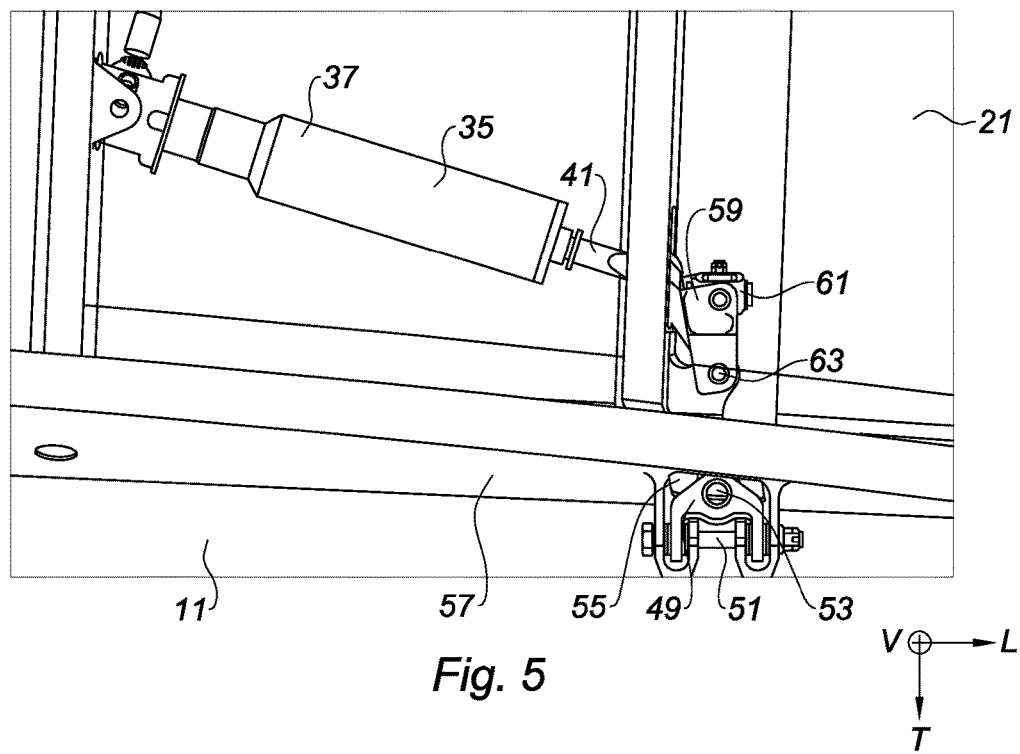
FIG. 5 is an enlarged side view of the actuation system of FIG. 4.
Figure 6:
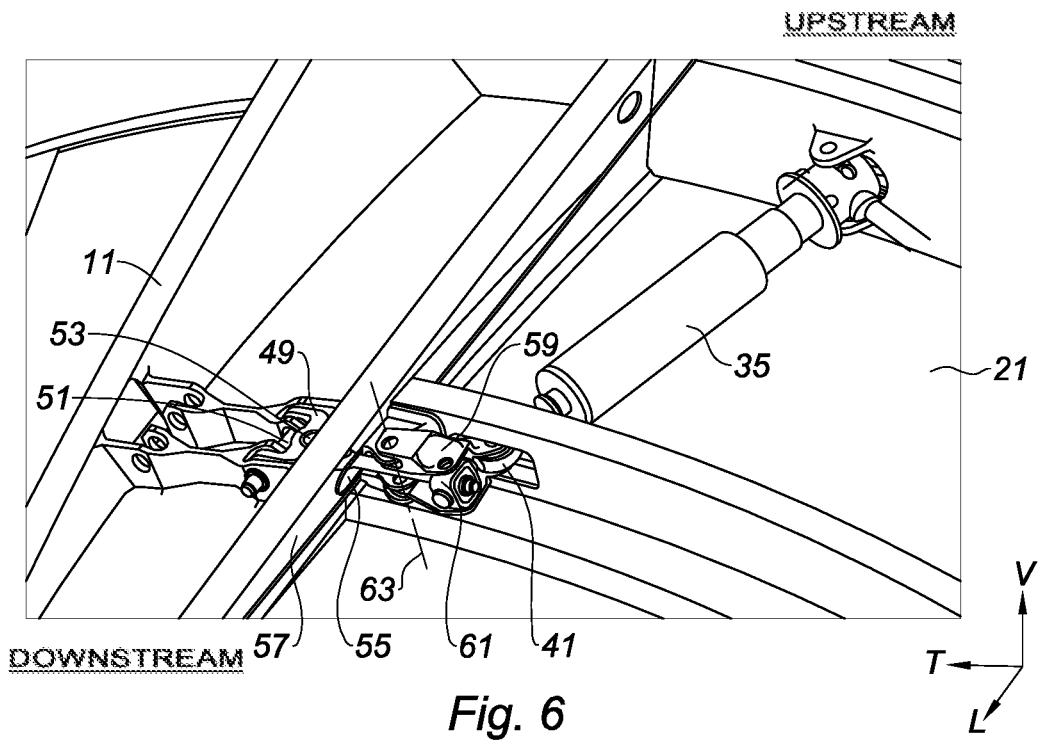
FIG. 6 is an enlarged perspective view of the actuation system of FIG. 4.

Referring to FIGS. 4 to 6 which show a part of the panel 21 maintained in the closed position on the structure 17 of the outer cowling of the nacelle by an actuation system 30 of the present disclosure.

In this first form, the actuation system 30 is designed to lock the panel 21 in the closed position and to pivot the panel 21 about an axis 31 substantially transverse to the longitudinal axis of the nacelle when the passage of the panel 21 between its closed position and its open position is controlled.

FIG. 4 shows only half of the panel 21 maintained in the closed position on the structure 17 by the actuation system 30. A second actuation system 30' may further be provided by symmetry relative to the axis of symmetry 33 of the panel 21, allowing to improve the maintenance of the panel 21 in the closed position and the displacement thereof.

The actuation system 30 includes a linear actuator 35 whose fixed body 37 is attached to an upstream wall 39 of the panel 21 and movable rod 41 is attached to a lateral tie rod 43 of the actuation system 30 via a movement transmission system 44 described hereinafter. The linear actuator 35 can be typically constituted by an electric cylinder whose rod is moved by a shaft 45 of an electric motor 47. Alternatively, the linear actuator 35 can be constituted by a hydraulic or even a pneumatic cylinder (not shown).

A first end 43a of the lateral tie rod 43 is connected to the structure 17 of the outer cowling of the nacelle. For this purpose, the structure 17 is provided with a yoke 49 pivotally mounted on a first pivot axis 51 substantially parallel to the longitudinal axis of the nacelle, said yoke receives the end 43a of the lateral tie rod 43.

Thus, the lateral tie rod 43 is pivotally mounted about the first pivot axis 51 substantially parallel to the longitudinal axis of the nacelle.

The lateral tie rod 43 is further pivotally mounted about a second pivot axis 53 of the yoke 49, substantially perpendicular to the first pivot axis 51, such that the lateral tie rod 43 is capable of pivoting relative to the structure of the outer cowling which approximates the panels 21, both about the first pivot axis 51 and about the second pivot axis 53.

The lateral tie rod 43 further passes through an opening 55 in the form of an oblong hole, substantially profiled in a side wall 57 of the panel 21. As shown in the figures, "side wall" of the panel 21 means a wall of the panel 21 whose surface substantially forms part of a plane (L, V). More precisely, the side wall 57 is substantially in a plane perpendicular to the axis of rotation 31 of the door 21, while the upstream wall 39 of the panel 21, transverse to the side walls 57, substantially forms part of a plane (T, V). It may to this end be noted that the panel 21 includes an upstream wall 39 and two side walls 57, these two walls remaining substantially parallel, since perpendicular to the axis of rotation 31 of the door 21.

A second end 43b of the lateral tie rod 43 is connected by a ball joint connection to the movement transmission system 44 attached to the movable panel and engaged with the movable rod 41 of the actuator 35.

With regard to the movement transmission device, it comprises a yoke 59 or rocker attached, on one side, to the side wall 57 of the panel 21, and on the other side, to the end of the movable rod 41 of the actuator 35. This yoke receives a "cardan-type" spider 61 on which is mounted via a ball joint connection the second end 43b of the lateral tie rod 43.

The yoke 59 is pivotally mounted on an axis 63, substantially vertical and substantially parallel to the axis 53 about which the yoke 49 is pivotally mounted.

The set of elements that constitute the actuation system are located in an inner space E of the panel 21 defined by the side walls 57 and by the upstream wall 39 of the panel 21, with the exception of the lateral tie rod 43 which is contained only partially in the space E of the panel 21, since the lateral tie rod 43 passes through the opening 55 profiled on the side wall 57 of the panel 21.

Figure 7:
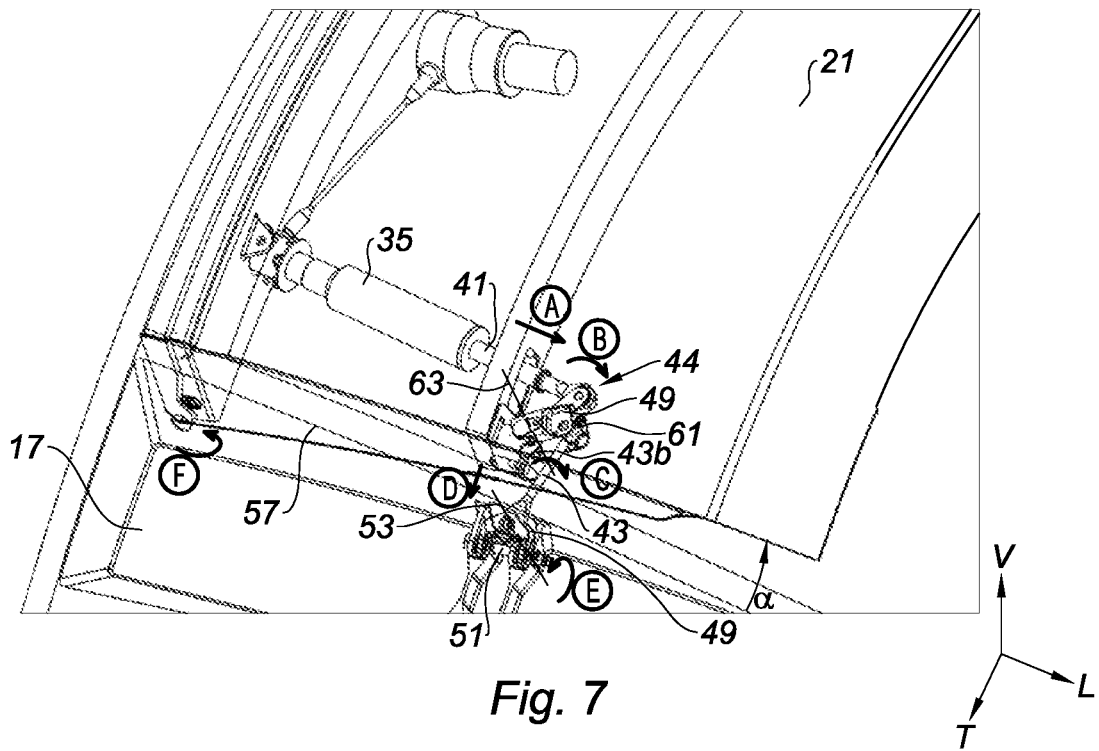
FIG. 7 illustrates the actuation system of FIGS. 4-6, the panel being in the open position.
Figure 8:
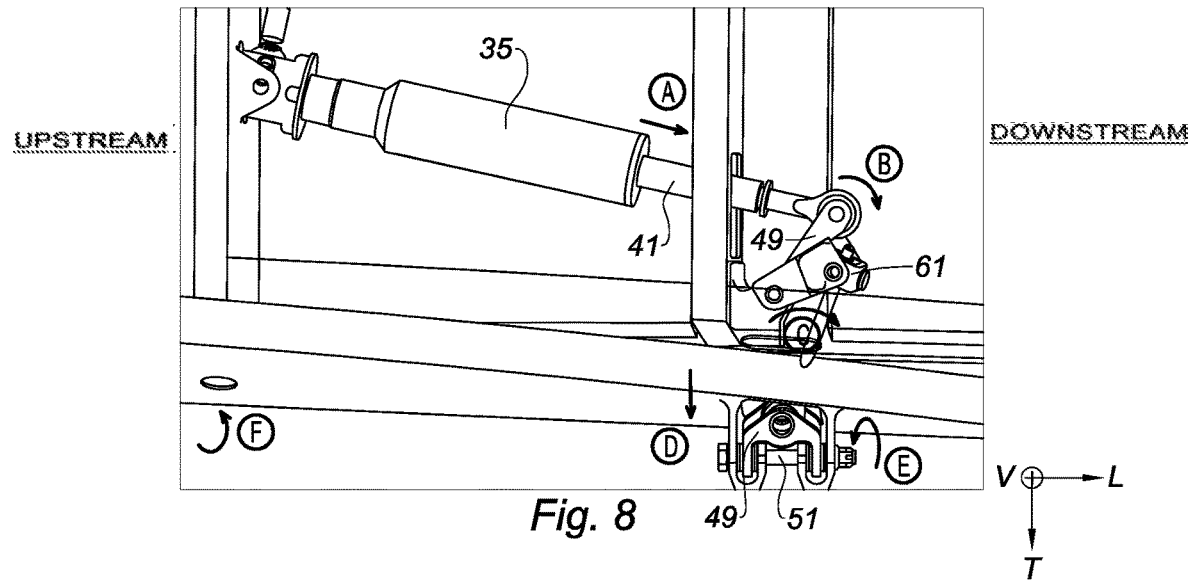
FIG. 8 is an enlarged side view of the actuation system of FIG. 7.
Figure 9:
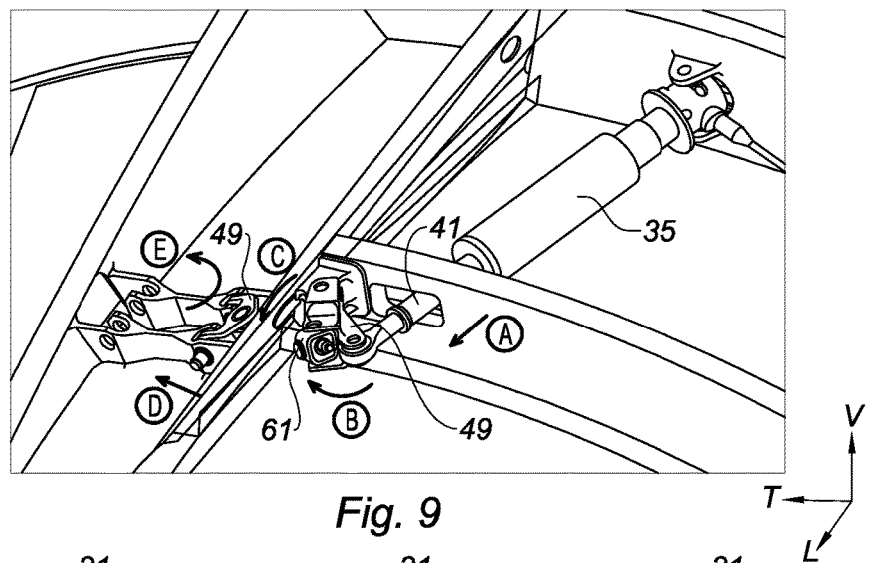
FIG. 9 is an enlarged perspective view of the actuation system of FIG. 7.

The operation of the actuation system of the first form of the present disclosure will now be described with reference to FIGS. 7 to 9 which illustrate the panel 21 in the open position.

The passage from the closed position of the panel 21, shown in FIGS. 4 to 9, to the open position of this panel 21, is achieved by controlling the extension of the actuator 35 rod 41 (arrow A) attached to the lateral tie rod 43 via the movement transmission system 44 comprising the yoke 59 or rocker and the spider 61 on which is mounted via a ball joint connection the end 43b of the lateral tie rod 43.

Following the extension of the actuator 35 rod 41, the yoke 59, or rocker, being attached to the side wall 57 and pivotally mounted on its substantially vertical axis 63, is rotated (arrow B) in the reference frame of the panel 21. The rotation of the yoke 59, or rocker, causes the rotation of the spider 61 attached to the yoke 59 as well as the rotation of the lateral tie rod 43 (arrow C) about its second pivot axis 53, the lateral tie rod 43 being mounted on the spider by a ball joint connection.

For a predetermined value of the extension of the actuator 35 rod 41, the rotation of the yoke 59, or rocker, and the one of the spider 61, has the effect of pushing the lateral tie rod 43 (arrow D) in the direction of the yoke 49 attached to the structure 17.

The lateral tie rod 43 then drives the yoke 49 in rotation about the second pivot axis 51 (arrow E), which causes the displacement of the lateral tie rod 43 such that the lateral tie rod 43 exerts a force on the panel 21 during its displacement so as to cause the pivoting of the panel about its axis 31 (arrow F).

The panel 21 then has pivoted about its axis 31 by an angle α relative to its closed position, and is thus in its open position.

Figure 10:
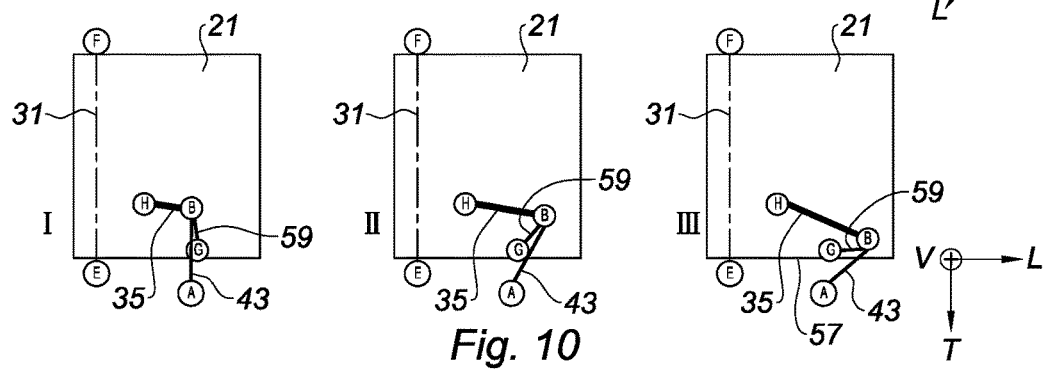
FIG. 10 is a progressive schematic diagram illustrating the kinematics of the actuation system when the system displaces the panel from its closed position to its open position according to the present disclosure.

The kinematics of the passage from the closed position to the open position of the panel 21 will even be better understood thanks to FIG. 10 to which reference is now made.

In FIG. 10, the phase I illustrates the panel 21 in the closed position, the phase II illustrates the panel in the intermediate position and the phase III illustrates the panel in the open position.

The straight-line EF represents the pivot axis 31 of the panel 21. The segment HB represents the linear actuator 35. The segment BG represents the yoke 59, or rocker, the point G corresponding to the attachment point of the yoke 59 to the side wall 57 of the panel 21. The segment BA represents in turn the lateral tie rod 43, connected to the actuator via the movement transmission device comprising the yoke 59. The lateral tie rod 43 (segment AB) and the yoke 59 (segment GB) form a three-point system (A, B and G).

In phase I, the points A, B and G are all three aligned, that is to say that the yoke 59 and the lateral tie rod 43 are aligned, which allows to nearly eliminate any force on the actuation system of the present disclosure.

In phase II, during which the panel 21 is passing from its closed position of phase I to its open position of phase III, the actuator 43 (segment HB) was extended relative to its extension shown in phase I. The yoke 59 (segment BG) is then driven in rotation in the reference frame of the panel 21.

When the point B goes beyond the axial position of the point G (phase III), the point B approaches the side wall 57 of the panel 21 and a force is exerted on the lateral tie rod 43 (segment BA). The lateral tie rod 43, mounted on the yoke 49 attached to the structure 17, then pivots such that the lateral tie rod 43 exerts, during its displacement, a force on the panel 21 so as to cause the pivoting of the panel 21 about its axis 31 (segment EF).

It should be noted that the axis common to the actuator 35 and to its rod 41 will be advantageously aligned with the central point B of the spider 61 in a plane perpendicular to the axis of rotation of the rocker 49. This arrangement allows to substantially reduce parasitic forces on the rocker 49 and its interfaces with the door. In this case, the actuator 35, its connection to the rocker 49 and the center point B of the spider 61, will remain coplanar throughout the movement.

The mounting mode of the tie rod 43 may have many variants. One variant may be mentioned in particular where the axis 53 is removed and where the tie rod passes through a hole parallel to its axis and is blocked by a bearing allowing its own rotation and taking over the traction force of the tie rod on the side of the door.

This variant no longer includes a ball joint in the spider 61, the rotation of the tie rod about AB being taken over by the bearing mounted on the structure of the outer cowling which approximates the movable panels. It is specifically interesting when the kinematics of the door imposes on the tie rod 43 a significant rotation about its axis AB exceeding the capacities of the ball joint of the cardan 61.

Figure 11:
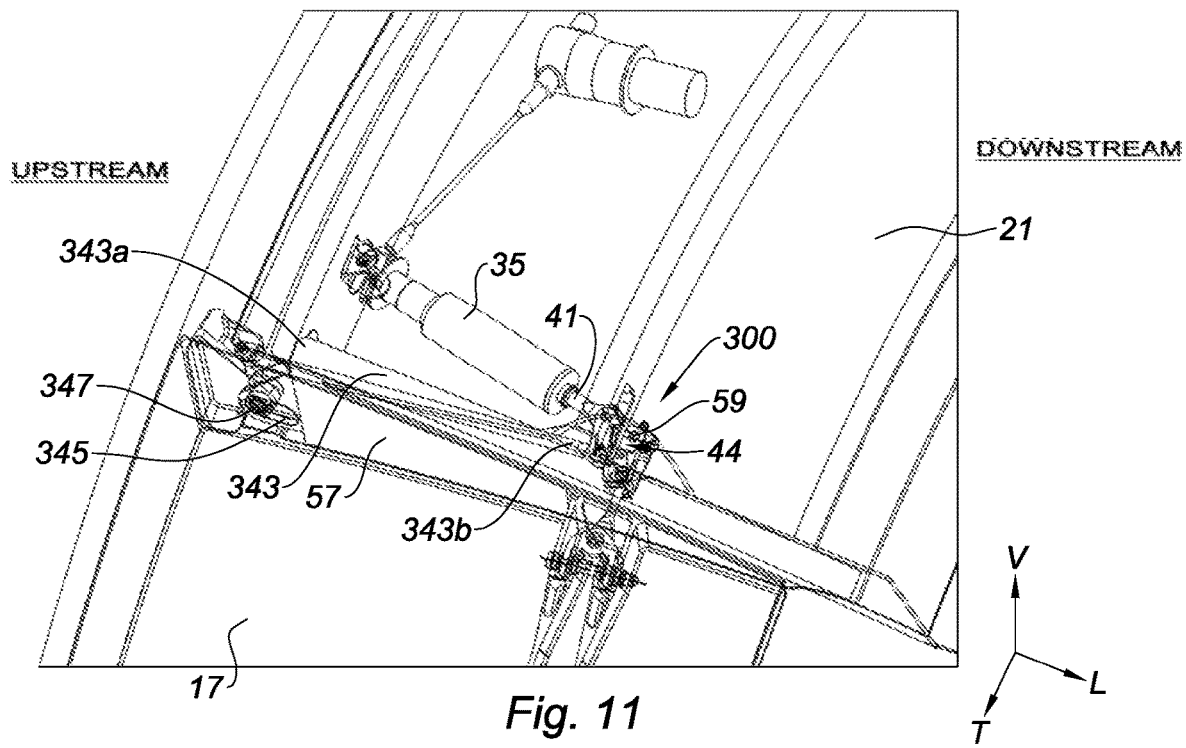
FIG. 11 shows the actuation system made according to a second form of the present disclosure, the panel being in the closed position.
Figure 12:
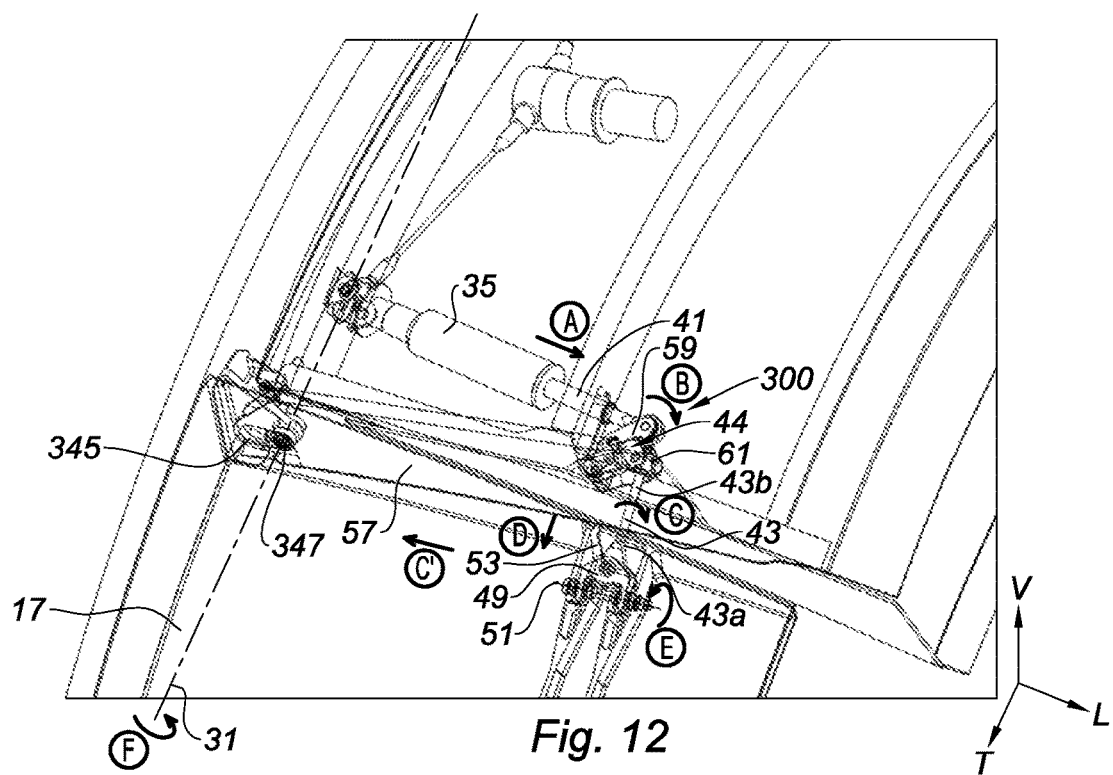
FIG. 12 shows the actuation system of FIG. 11, the panel being in the open position.

Referring now to FIGS. 11 and 12, an actuation system 300 obtained according to a second form of the present disclosure is illustrated.

The actuation system 300 of the second form is similar to the actuation system 30 except that it is further designed to drive the panel 21 in translation simultaneously to the rotational movement when the passage of the panel 21 between its closed position and its open position is controlled. More precisely, the actuation system 300 is designed to drive the panel 21 from a downstream position of the nacelle to an upstream position of the nacelle when the panel 21 passes from its closed position to its open position and, alternatively, from an upstream position of the nacelle to a downstream position of the nacelle when the panel 21 passes from its open position to its closed position.

To this purpose, the actuation system 300 comprises, other than the members that compose the actuation system 30, a longitudinal tie rod 343, substantially positioned along the longitudinal axis of the nacelle, whose first end 343a is connected to the structure 17 of the outer cowling 11 and whose second end 343b is connected to the movement transmission system 44 attached to the movable panel 21 and engaged with the movable rod 41 of the actuator 35. More precisely, the second end 343b of the longitudinal tie rod 343 is connected to the yoke 59 or rocker of the movement transmission device 44.

In this second form, the panel 21 is not only rotatably mounted about the axis 31 substantially transverse to the longitudinal axis of the nacelle, but it is also mounted free in translation along an axis substantially parallel to the longitudinal axis of the nacelle.

In order to perform this translation, the side wall 57 of the movable panel 21 includes an oblong hole 345 in which is mounted a roller 347 secured to the structure 17 of the outer cowling 11 so as to authorize translation of the movable panel 21 along an axis substantially parallel to the longitudinal axis of the nacelle.

Of course, any means allowing translation of the movable panel 21 along the longitudinal axis of the nacelle can be envisaged. The use of a rail arranged on the side wall 57 of the panel 21, will for example be considered, receiving a ball joint secured to the structure of the outer cowling which approximates the movable panels 21.

The operation of the actuation system of the second form of the present disclosure will now be described.

The passage from the closed position of the panel 21, shown in FIG. 11, to the open position of this panel 21 shown in FIG. 12, is achieved by controlling extension of the actuator 35 rod 41 (arrow A) attached to the lateral tie rod 43 and to the longitudinal tie rod 343 via the movement transmission system 44 comprising the yoke 59 or rocker and the spider 61 on which is mounted via a ball joint connection the end 43b of the lateral tie rod 43.

Following the extension of the actuator 35 rod 41, the yoke 59, or rocker, being attached to the side wall 57 and pivotally mounted on its substantially vertical axis 63, is rotated (arrow B) in the reference frame of the panel 21. The rotation of the yoke 59, or rocker, causes rotation of the spider 61 attached to the yoke 59 as well as rotation of the lateral tie rod 43 (arrow C) about its second pivot axis 53, the lateral tie rod 43 being mounted on the spider by a ball joint connection. Simultaneously, the rotation of the yoke 59 is retained by the longitudinal tie rod 343, which acts on the panel 21 tending to displace the panel 21 to the upstream of the nacelle (arrow C'). The oblong hole 345 made in the side wall 57 of the panel 21, in engagement with the roller 347 secured to the structure 17 of the outer cowling 11, authorizes translation of the movable panel 21 along an axis substantially parallel to the longitudinal axis of the nacelle.

For a predetermined value of the extension of the actuator 35 rod 41, the rotation of the yoke 59, or rocker, and the one of the spider 61, has the effect of pushing the lateral tie rod 43 (arrow D) in the direction of the yoke 49 attached to the structure 17. The lateral tie rod 43 then drives the yoke 49 in rotation about the second pivot axis 51 (arrow E), which causes the displacement of the lateral tie rod 43. The displacement of the lateral tie rod 43 causes, during its displacement, the exertion of a force on the panel 21 so as to cause pivoting of the panel about its axis 31 (arrow F).

The panel 21 has then pivoted about its axis 31 by an angle α relative to its closed position, and simultaneously translated to the upstream of the nacelle. The panel 21 is thus in its open position.

In both forms of the actuation system, the actuation system of the panel 21 is thus designed to lock the panel 21 in its closed position and to alternately displace it between its closed position and its open position.

The actuation system of the present disclosure is designed so that the opening forces of the panel 21 are taken over by the lateral tie rods 43 of the actuation system and not by the longitudinal actuator as is the case in the prior art. The forces are therefore substantially distributed along the circumference of the nacelle. Furthermore, when the panel 21 is in its closed position, the yoke and the lateral tie rod 43 of the actuation system are aligned, which advantageously allows to nearly eliminate any force on the actuation system. It may be advantageous in some cases to go beyond this three-points mechanism in order to stabilize the door in the closed position.

It goes without saying that the present disclosure is not limited to the sole forms of this nacelle, which are described above only by way of illustrative examples, but on the contrary, it embraces all the variants involving the technical equivalents of the described means as well as their combinations if the latter fall within the scope of the present disclosure.

It should be noted to this end that the actuation system according to the present disclosure is not limited to panels of a secondary air flow ejection nozzle, and the use of the actuation system to displace a door of a door-type thrust reverser is however envisaged. In addition, when the actuation system is used to displace nozzle panels, the nacelle can of course be provided with a cascade-type thrust reverser device or with a door-type thrust reverser device whose actuation system of the doors may be that of the present disclosure.

In addition, the present disclosure uses a central motor, with an angle transmission, leading two shafts substantially disposed in a symmetrical manner and driving, via another angle transmission, each shaft to both actuators 35. A differential can also be added to the output of the motor.

Another actuation mode can also use two motors directly combined with the actuators 35 on each door.

In another form, the longitudinal tie rods may be replaced by actuators whose one end is connected to the structure 17 and the other to the rocker 49. In this case, the actuators 35 are replaced by fixed tie rods. This generally less advantageous configuration in terms of forces on the actuators can however be interesting in certain cases of specific aerodynamic lines.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for an aircraft turbojet engine, the nacelle comprising:
   an outer cowling comprising:
   a structure comprising at least one aperture; and
   at least one panel pivotally mounted about an axis between a closed position that obstructs said at least one aperture and an open position in which part of a secondary air flow, flowing through an annular channel defined between said outer cowling and an inner fixed structure of the nacelle defining a fairing of the turbojet engine passes through the at least one aperture; and
   an actuation system that locks the at least one panel in said closed position and displaces said at least one panel between said closed position and said open position, the actuation system comprising:
   at least one lateral tie rod connected on one side to the at least one panel and connected to the structure of the outer cowling on another side, said at least one lateral tie rod being pivotally mounted relative to the structure of the outer cowling at a first location about a first pivot axis substantially parallel to a longitudinal axis of the nacelle and about a second pivot axis substantially perpendicular to the first pivot axis at a second location different than the first location; and
   a linear actuator attached to said at least one lateral tie rod, the linear actuator extendable between a retracted position and an extended position, wherein the actuation system displaces the at least one lateral tie rod during extension of said linear actuator, causing the at least one lateral tie rod to pivot about said first and said second pivot axes, and so that the at least one lateral tie rod, bearing on the structure, exerts, during its displacement, a force on the at least one panel, causing a pivoting of said at least one panel about its axis.

2. The nacelle according to claim 1, wherein the linear actuator is attached to the at least one lateral tie rod by a movement transmission device comprising: a yoke attached to the at least one panel and pivotally mounted about a vertical axis, a movable rod of the linear actuator being attached to said yoke; and a spider mounted to a second end of the at least one lateral tie rod via a ball joint connection.

3. The nacelle according to claim 2, wherein the linear actuator and the movement transmission device are located in an inner space of the at least one panel.

4. The nacelle according to claim 1, wherein the at least one panel is further mounted free in translation along an axis parallel to the longitudinal axis of the nacelle, wherein the actuation system drives the at least one panel from a downstream position to an upstream position of the nacelle when the at least one panel passes from the closed position to the open position.

5. The nacelle according to claim 4, wherein at least one side wall of the at least one panel includes an oblong hole having a roller secured to the structure of the outer cowling such that the at least one panel is movable in translation along the axis parallel to the longitudinal axis of the nacelle, wherein the actuation system comprises a longitudinal tie rod having a first end connected to said structure of the outer cowling and a second end connected to a yoke of a movement transmission device.

6. The nacelle according to claim 4, wherein at least one side wall of the at least one panel includes a rail receiving a ball joint or a slider secured to the structure of the outer cowling such that the at least one panel is movable in translation along the axis substantially parallel to the longitudinal axis of the nacelle, wherein the actuation system comprises a longitudinal tie rod having a first end connected to said structure of the outer cowling and a second end connected to a yoke of a movement transmission device.

7. The nacelle according to claim 1, wherein a first end of the at least one lateral tie rod is connected to the structure of the outer cowling via a yoke pivotally mounted about the first pivot axis.

8. The nacelle according to claim 7, wherein the at least one lateral tie rod is further pivotally mounted relative to the yoke about the second pivot axis.

9. The nacelle according to claim 1, wherein the at least one panel includes an opening profiled on at least one side wall of the at least one panel, and the at least one lateral tie rod passes through said opening.

10. The nacelle according to claim 1, wherein the linear actuator is attached to an upstream wall of the at least one panel.

11. The nacelle according to claim 1, wherein the actuation system is one of two actuation systems that are symmetrical relative to an axis of symmetry of the at least one panel, each of the two actuation systems comprising a hydraulic, electrical, or aeraulic actuation motor.

12. The nacelle according to claim 1, wherein the at least one panel is further translated in a direction parallel to the longitudinal axis of the nacelle, and the actuation system alternately drives the at least one panel between a downstream position to an upstream position of the nacelle when the at least one panel passes from the closed position to the open position.

13. The nacelle according to claim 1, wherein the at least one panel is a panel of a secondary air flow ejection nozzle.

14. The nacelle according to claim 1, wherein the outer cowling forms a sliding cowl of a thrust reverser device.

* * * * *